Patented Feb. 9, 1954

2,668,824

UNITED STATES PATENT OFFICE 2,668,824

O-(4-NITROPHENYL) S-(ETHYLXANTHOYL) DITHIOPHOSPHORIC CHLORIDE

Henry Tolkmith, Midland, Mich., assignor to The Dow Chemical Company, Midland, Mich., a corporation of Delaware No Drawing. Application April 21, 1953, Serial No. 350,237

1 Claim. (Cl. 260—455)

This invention is directed to O-(4-nitrophenyl) S-(ethylxanthoyl) dithiophosphoric chloride of the formula

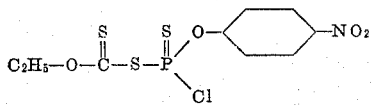

This compound is a viscous oil, somewhat soluble in many organic solvents and substantially insoluble in water. It is of value as an intermediate for the preparation of more complex organic derivatives and as a toxic constituent of parasiticide compositions.

The new compound may be prepared by reacting 4-nitrophenol with S-(ethylxanthoyl) dithiophosphoric dichloride of the formula

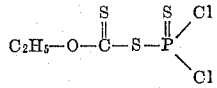

in an inert organic solvent such as diethyl ether or benzene. The reaction is carried out in the presence of a hydrogen chloride acceptor, such as pyridine. Good results are obtained when substantially equimolecular proportions of the reactants are employed.

In carrying out the reaction, a mixture of the 4-nitrophenol, pyridine and solvent is added with stirring to the S-(ethylxanthoyl) dithiophosphoric dichloride and the resulting dispersion heated for a period of time at a temperature of from 35° to 80° C. Temperatures substantially in excess of 80° C. for any appreciable period of time should be avoided, as the desired product has a tendency to decompose at such temperature. Upon completion of the reaction, the mixture may be filtered and the filtrate distilled under reduced pressure at gradually increasing temperatures up to a temperature of 80° C. to separate low boiling constituents and to obtain as a residue the desired O-(4-nitrophenyl) S-(ethylxanthoyl) dithiophosphoric chloride.

In an alternative method, the new compound may be prepared by reacting one molecular proportion of an alkali metal 4-nitrophenolate with one molecular proportion of S-ethylxanthoyl-dithiophosphoric dichloride in an inert organic solvent such as benzene. Sodium 4-nitrophenolate is preferably employed as the alkali metal phenolate reactant. In carrying out the reaction the sodium 4-nitrophenolate, S-(ethylxanthoyl) dithiophosphoric dichloride, and solvent are mixed together with stirring and the resulting dispersion heated for a period of time at a temperature of from 30° to 80° C. Upon completion of the reaction, the desired product is separated in the manner as previously described.

The S-(ethylxanthoyl) dithiophosphoric dichloride employed as a starting material in the above-described method may be prepared by reacting at least two molecular proportions of phosphorus thiochloride (PSCl₃) with one molecular proportion of sodium ethylxanthate in an inert solvent such as benzene. In carrying out the reaction, the reactants are dispersed in the solvent and the resulting mixture heated for a period of time at a temperature of from 40° to 80° C. To avoid decomposition, temperatures substantially in excess of 80° C. should not be employed. Upon completion of the reaction, the mixture may be filtered and the filtrate concentrated by distillation under reduced pressure to a temperature up to 80° C. to obtain as a residue the desired S-(ethylxanthoyl) dithiophosphoric dichloride. This compound is a viscous oil having a density of 1.451 at 21° C. The latter compound and described method for its production was disclosed in my application Serial No. 203,768, filed December 30, 1950.

In a representative preparation, a mixture of 72 grams (0.52 mole) of 4-nitrophenol, 46.5 grams (0.59 mole) of pyridine and 1500 milliliters of diethyl ether was added portionwise with stirring to 132 grams (0.518 mole) of S-(ethylxanthoyl) dithiophosphoric dichloride and the resulting dispersion heated for 8 hours at the boiling temperature and under reflux. At the end of this period, the mixture was filtered and the filtrate concentrated by distillation under reduced pressure to a temperature up to 50° C. to obtain as a residue an S-(ethylxanthoyl) O-(4-nitrophenyl) dithiophosphoric chloride product. The latter was a viscous oil having a density of 1.4901 at 20° C.

The new O-(4-nitrophenyl) S-(ethylxanthoyl) dithiophosphoric chloride has been tested and found effective as a parasiticide and is adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture.

This is a continuation in part of my copending application Serial No. 203,766, filed December 30, 1950.

I claim:

O-(4-nitrophenyl) S-(ethylxanthoyl) dithiophosphoric chloride.

HENRY TOLKMITH.

No references cited.